(12) United States Patent
Kawelke

(10) Patent No.: US 10,954,882 B2
(45) Date of Patent: Mar. 23, 2021

(54) INTERNAL COMBUSTION ENGINE HAVING A CYLINDER HEAD AND A SECONDARY AIR SYSTEM

(71) Applicant: VOLKSWAGEN AKTIENGESELLSCHAFT, Wolfsburg (DE)

(72) Inventor: Peter Kawelke, Isenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/465,450

(22) PCT Filed: Nov. 23, 2017

(86) PCT No.: PCT/EP2017/080249
§ 371 (c)(1),
(2) Date: May 30, 2019

(87) PCT Pub. No.: WO2018/099804
PCT Pub. Date: Jun. 7, 2018

(65) Prior Publication Data
US 2020/0003149 A1    Jan. 2, 2020

(30) Foreign Application Priority Data
Dec. 2, 2016 (DE) .................... 10 2016 123 375.7

(51) Int. Cl.
*F02F 1/24* (2006.01)
*F01N 3/34* (2006.01)
(Continued)

(52) U.S. Cl.
CPC ................ *F02F 1/243* (2013.01); *F01N 3/34* (2013.01); *F01N 13/105* (2013.01); *F01N 2270/00* (2013.01); *F02F 2001/4278* (2013.01)

(58) Field of Classification Search
CPC .............. F02F 1/243; F02F 2001/4278; F01N 2270/00; F01N 3/34; F01N 13/105
(Continued)

(56) References Cited

U.S. PATENT DOCUMENTS 3,906,722 A * 9/1975 Garcea ...................... F01N 3/22
60/293
4,177,640 A   12/1979 Hayashi et al.
(Continued)

FOREIGN PATENT DOCUMENTS

DE   20 2006 004 838 U1   6/2006
DE   10 2012 202 334 A1   8/2012
(Continued)

OTHER PUBLICATIONS

International Search Report of PCT Application No. PCT/EP2017/080249, dated Feb. 8, 2018.
(Continued)

*Primary Examiner* — Thai Ba Trieu
(74) *Attorney, Agent, or Firm* — Pearl Cohen Zedek Latzer Baratz LLP

(57) ABSTRACT

An internal combustion engine has a cylinder head having an integrated exhaust manifold having exhaust ducts connected to a secondary air system's distributor block via its supply ducts for supplying ambient air through an inlet as secondary air into the exhaust manifold. Each supply duct having a valve assembly having a closure flap pivotable about a pivot axis at a distance from its the center of mass. The closure flap closing due to the influence of gravity when there is no pressure difference between the exhaust manifold and the secondary air system and opening automatically due to a relative overpressure in the gas pressure on the side of the secondary air system in relation to the gas pressure on the side of the exhaust manifold.

6 Claims, 4 Drawing Sheets

(51) Int. Cl.
*F01N 13/10* (2010.01)
*F02F 1/42* (2006.01)

(58) Field of Classification Search
USPC .................................. 60/293, 290, 298, 289
See application file for complete search history.

(56) References Cited

U.S. PATENT DOCUMENTS

| | | | | |
|---|---|---|---|---|
| 4,194,477 A | * | 3/1980 | Sugiyama | F02M 23/085 |
| | | | | 123/327 |
| 5,832,725 A | * | 11/1998 | Sim | F01N 3/22 |
| | | | | 60/289 |
| 6,334,436 B1 | * | 1/2002 | Paffrath | F01N 3/32 |
| | | | | 60/290 |
| 6,634,167 B1 | * | 10/2003 | Toshioka | F01N 3/22 |
| | | | | 60/284 |
| 6,883,323 B2 | * | 4/2005 | Hummel | F01N 3/22 |
| | | | | 60/290 |
| 8,127,731 B2 | * | 3/2012 | Lai | F01N 3/34 |
| | | | | 60/293 |
| 8,429,896 B2 | * | 4/2013 | Pekrul | F01N 3/22 |
| | | | | 60/293 |
| 9,115,628 B2 | * | 8/2015 | Guidi | F01N 3/30 |
| 2003/0172913 A1 | * | 9/2003 | Hummel | F01N 3/22 |
| | | | | 123/559.1 |
| 2003/0192502 A1 | | 10/2003 | Joos et al. | |
| 2012/0210712 A1 | | 8/2012 | Wu et al. | |
| 2013/0019593 A1 | | 1/2013 | Jacques et al. | |
| 2014/0230772 A1 | | 8/2014 | Hayman et al. | |
| 2016/0281634 A1 | | 9/2016 | Wakiya | |

FOREIGN PATENT DOCUMENTS

| | | | | |
|---|---|---|---|---|
| DE | 10 2012 212 218 A1 | 1/2013 | | |
| DE | 10 2014 101 595 A1 | 8/2014 | | |
| DE | 10 2014 007 190 A1 | 11/2015 | | |
| EP | 1 835 238 A2 | 9/2007 | | |
| GB | 1 520 178 A | 8/1978 | | |
| GB | 2292975 A | * | 3/1996 | ............... F01N 3/34 |
| JP | 57079212 A | * | 5/1982 | ............... F01N 3/34 |
| JP | S58-170811 A | 10/1983 | | |
| JP | 62041917 A | * | 2/1987 | ............... F01N 3/34 |
| JP | 2007085267 A | * | 4/2007 | ............... F01N 3/34 |
| WO | WO 2009/036476 A1 | 3/2009 | | |

OTHER PUBLICATIONS

Office Action for Korean Patent Application No. 10-2019-7018428, dated Jun. 26, 2020.

* cited by examiner

INTERNAL COMBUSTION ENGINE HAVING A CYLINDER HEAD AND A SECONDARY AIR SYSTEM

CROSS-REFERENCE TO RELATED APPLICATIONS

This application is a National Phase Application of PCT International Application No. PCT/EP2017/080249, International Filing Date Nov. 23, 2017, claiming priority of German Patent Application No. 10 2016 123 375.7, filed Dec. 2, 2016, which is hereby incorporated by reference.

FIELD OF THE INVENTION

The invention relates to an internal combustion engine comprising a cylinder head that is equipped with an exhaust manifold having multiple exhaust ducts, and a secondary air system, the internal combustion engine having at least one valve assembly for restricting a fluid flow of the exhaust gas from the exhaust manifold to the secondary air system. The invention further relates to a cylinder head for such an internal combustion engine.

BACKGROUND OF THE INVENTION

The pollutant emissions of an internal combustion engine can be effectively reduced by catalytic after-treatment with the aid of catalytic converters in conjunction with a lambda closed-loop control. One important prerequisite for this, however, is that not only the lambda sensor of the lambda closed-loop control device but also the catalytic converter has reached its light-off temperature. One way to quickly heat the catalytic converter is to inject secondary air downstream from the exhaust valves into the exhaust manifold of the internal combustion engine. The secondary air is supplied by a secondary air pump and fed via a line system containing a secondary air valve downstream from the exhaust valves of the internal combustion engine into the exhaust gas. The exothermic reaction of the secondary air with unburned fuel in the hot exhaust gas and the further oxidation thereof upstream from and in the catalytic converter leads to accelerated heating of the catalytic converter to its operating temperature and thus to a reduction of pollutant emissions in the warm-up phase of the internal combustion engine.

It is known to supply secondary air via a secondary air duct downstream from the exhaust valves as a function of the engine temperature. For example, a non-return valve designed as a combi-valve opens the airway to an air duct in the cylinder head on the exhaust side and prevents exhaust gases from escaping from the internal combustion engine into the environment during idling. As soon as negative pressure is applied, a diaphragm in the valve pulls down a plunger with a seal, thus opening the duct for the secondary air.

An internal combustion engine is also already disclosed by DE 10 2014 101 595 A1, which relates to a secondary air injection system with separate flow paths for each set of manifold pipes in a branched exhaust system.

An internal combustion engine with an exhaust passage in a cylinder head of the internal combustion engine and a one-way valve is known from DE 10 2012 212 218 A1 which is coupled with a secondary air system, the one-way valve restricting fluid communication from the exhaust duct to the secondary air system.

DE 10 2014 007 190 A1 relates to an exhaust system of an internal combustion engine with a secondary air valve for controlling the supply of secondary air in the exhaust system by virtue of which a quick response can be combined with a large flow cross section in the open position and backflow of exhaust gases into the fresh air tract can be reliably prevented.

Furthermore, DE 20 2006 004 838 U1 relates to an air duct with a check valve device for sealing an air path with at least one butterfly valve that is opened by an airflow flowing on the air path against a closing force. For this purpose, the air duct has an end that tapers toward its longitudinal extension. The butterfly valve is inclined relative to the vertical such that a weight force component of its mass generates the closing force. This results in less pressure loss in the air duct compared to spring solutions for generating the closing force, since the closing force of springs that must be overcome by the pressure exerted by the airflow increases with the spring deflection.

In practice, the introduction of the secondary air into the exhaust duct adjoining the exhaust manifold can lead to limited mixing of the exhaust gas with the secondary air, so that the conversion of pollutants in the catalyst is impaired and compliance with the exhaust emission limits is made more difficult.

Attempts have already been made to compensate for the disadvantage of deteriorating supercharging under the bending moment by adapting the design of the exhaust gas turbocharger. However, this is often associated with a degrading of the behavior of the exhaust gas turbocharger at nominal capacity, which is reflected, for example, in a higher rated power consumption or a reduced rated power of the internal combustion engine or a reduction in the so-called "heat/altitude reserve."

SUMMARY OF THE INVENTION

In light of this, it is the object of the invention to provide an improvement of the internal combustion engine, particularly with regard to the supercharging of the exhaust gas turbocharger, with minimal effort and expense. Furthermore, it is the object of the invention to provide a corresponding cylinder head.

Some embodiments of the invention include an internal combustion engine having a cylinder head with an integrated exhaust manifold which has multiple exhaust ducts and a secondary air stream, and having at least one valve assembly configured to restrict a fluid flow of the exhaust gas from the exhaust manifold to the secondary air stream. The exhaust manifold and secondary air stream may be integral components of the cylinder head. The secondary air system may have a plurality of supply ducts that are connected to a respective exhaust duct in the integrated exhaust manifold with at least one valve assembly. The at least one valve assembly may be arranged within the internal combustion engine below a plane of the exhaust manifold. Each of the at least one valve assembly may have a movable blocking means, such as a closing flap. The blocking means may be arranged so the blocking means is pivotable about a pivot axis that is located at a distance from the center of mass of the blocking means. The blocking means may be adjustable by, for example, an actuator. The blocking means may have a closed position where the blocking means may be in an inclined position relative to the cross-sectional plane of the supply duct, and the cross-section shape of the blocking means may deviate from the cross-sectional area on the cross-sectional plane of the supply duct. The blocking means may be configured to assume the closed position under the influence of gravity when there is no pressure difference between the exhaust manifold and the secondary air system. The blocking means may be configured to assume the open position due to a relative overpressure in the gas pressure on the side of the secondary air system in relation to the gas pressure on the side of the exhaust manifold. In some embodiments, there are a plurality of valve assembly, and each supply duct is equipped with a valve assembly.

An internal combustion engine is thus provided according to the invention in which the exhaust manifold and the secondary air system are designed as integral components of the cylinder head, the secondary air system having a plurality of supply ducts that are connected to a respective exhaust duct in the integrated exhaust manifold with at least one valve assembly. According to the invention, the valve assembly decouples the distributor block of the secondary air system from the integrated exhaust manifold. The valve assemblies are arranged in the supply duct between the integrated exhaust manifold and the secondary air system and configured so as to remain in the closed or nearly closed position during normal operation of the internal combustion engine, particularly at high loads and associated high gas pressures in the exhaust manifold. In those operating situations in which the catalytic converter has not yet reached its operating temperature and in which the secondary air system is active, the gas pressure in the exhaust manifold is substantially lower in comparison to high-load operating points of the internal combustion engine. The pressure in the secondary air system is then greater than in the exhaust manifold, so that the valve assembly is open and secondary air is able to flow into the exhaust manifold. As a result, the design of the exhaust gas turbocharger does not need to be adapted in order to ensure performance in connection with the secondary air system.

It has already been found to be especially advantageous if each supply duct is equipped with a valve assembly, so that the valve assembly can be integrated into the respective supply duct and therefore has only a small space requirement. In particular, the valve assembly can thus be arranged and/or retrofitted within the supply duct without any difficulty even in already existing internal combustion engines. In principle, an additional adjusting means is just as unnecessary as a control.

The valve assembly can have different shapes that are configured according to the contour and the profile of the supply duct. Especially preferably, the valve assembly has a movable blocking means, particularly a closing flap, that can be integrated with minimal effort and expense into the supply duct while also allowing for low flow resistance in the open position of the valve assembly. In addition, the setup of such a valve assembly requires no structural changes to the cylinder head.

Furthermore, the blocking means is pivotable about a pivot axis that is arranged at a distance from a centroid or center of mass of the blocking means. Thus, since the pivot axis does not pass through the centroid or center of mass of the blocking means, particularly of the closing flap, the latter assumes a defined angular position in a state in which it is free of external pressure influences that is preferably at least partially open. The closing flap thus closes under the influence of an overpressure of the exhaust manifold relative to the secondary air system. Apart from the acting compressive forces, the blocking means is preferably acted upon exclusively by gravity and, in particular, has no additional spring element.

A formation could be arranged in the respective supply duct, e.g., with a projection that reduces the free cross section, that serves as a stop for the blocking means. On the other hand, it is especially practical if the blocking means has a closed position that is configured so as to be inclined relative to the cross-sectional plane of the supply duct and if the cross-sectional shape of the blocking means deviates from the cross-sectional area on the cross-sectional plane of the supply duct near the pivot axis. For instance, in the case of a circular cross-sectional area within the supply duct, the blocking means is oval-shaped according to a sectional plane relative to the cross-sectional plane and cannot be pivoted further when the closed position is reached.

The later installed position of the internal combustion engine within the vehicle must be taken into account in the design of the closing flap. For instance, the transfer ports can be arranged so as to be inclined at an angle of 60° relative to the horizontal in the installed position.

The blocking means preferably consists of an elliptical disc with a shaft that is arranged eccentrically relative to the main axis transverse thereto, and a sleeve in which the shaft that is connected to the blocking means is supported. The sleeve has an inner diameter of 6 mm and an outer diameter of 10 mm, for example.

The mounting of the sleeve in the cylinder head can be achieved by means of a frictional or form-fitting connection, for example by pressing or screwing. For a screw connection, the sleeve is provided with an external thread.

The installation position must be taken into account during assembly according to the subsequent inclination of the internal combustion engine during operation in order to ensure the opening and closing function.

According to an especially preferred embodiment, in the absence of pressure difference between the exhaust manifold and the secondary air system, the blocking means assumes a parallel orientation relative to the main extension of the supply duct in a portion enclosing the blocking means, so that the flow resistance is reduced to a minimum.

It has also already proven to be especially expedient if the blocking means is designed to be adjustable, particularly in order to achieve a closed position that has a maximally optimal seal.

In another, also especially practical embodiment of the invention, the blocking means can be actuated particularly from the outside by means of an actuator (Not Shown), so that the functionality is also ensured independently of the subsequent installed position of the internal combustion engine.

Especially preferably, the valve assembly is arranged within the internal combustion engine below a plane of the exhaust manifold and above the plane of the secondary air system. In this variant, an arrangement occurs in the supply duct that is rotated by 180° about the pivot axis of the blocking means. When the internal combustion engine is switched off, or at low-load operating points of the internal combustion engine, and when the secondary air system is activated, the blocking means is open. At high-load operating points of the internal combustion engine, the blocking means is closed.

Moreover, the object is also achieved with a cylinder head for such an internal combustion engine into which are integrated a secondary air system and a plurality of supply ducts with a respective valve assembly comprising a blocking means that are connected to a respective exhaust duct of the internal combustion engine in the cylinder head.

BRIEF DESCRIPTION OF THE DRAWINGS

The invention allows numerous embodiments. To further clarify its basic principle, one of them is illustrated in the drawing and will be described below. In the drawing.

DETAILED DESCRIPTION OF THE INVENTION

Figure 1:
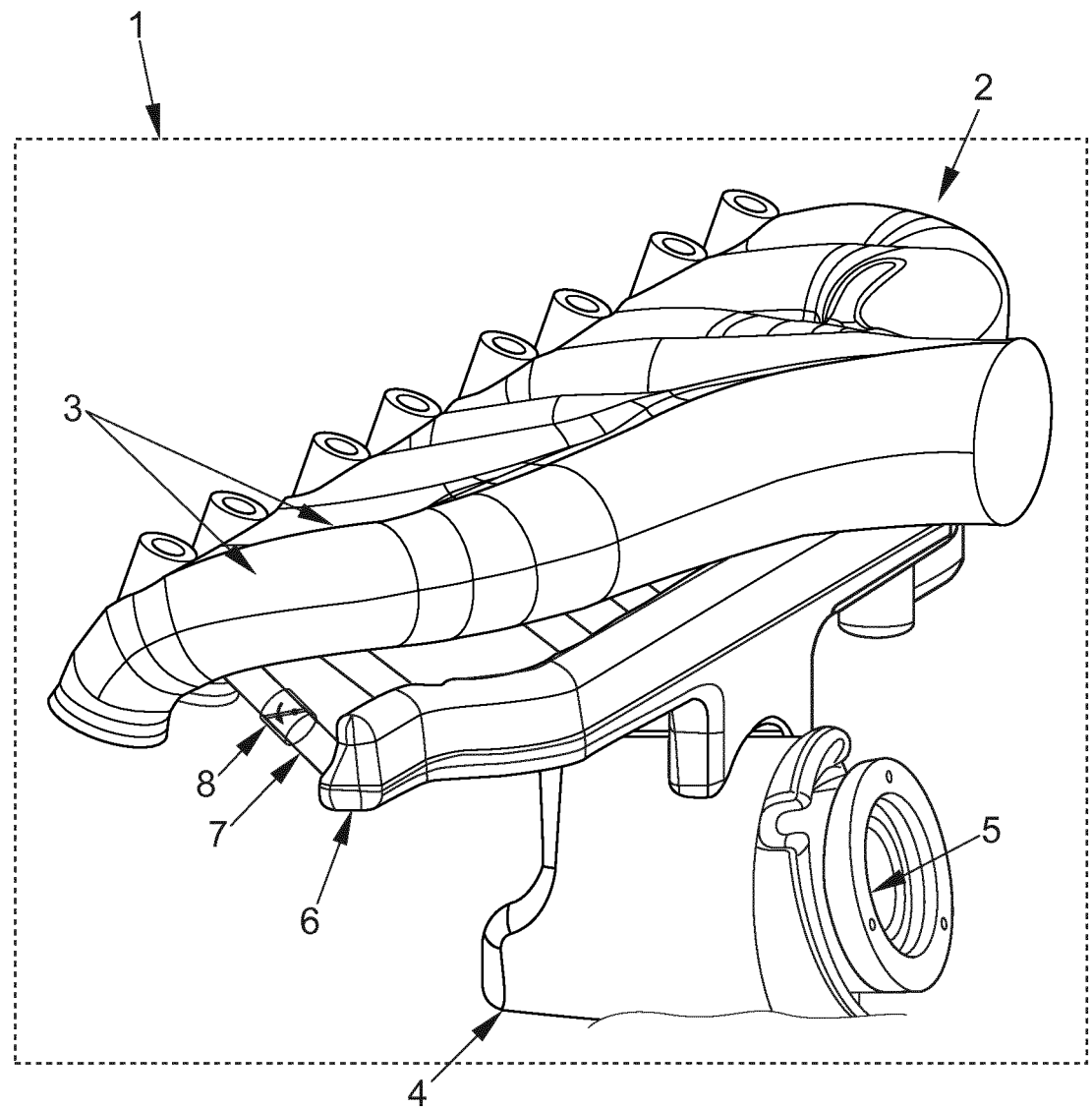
FIG. 1 shows a perspective view of a cylinder head with an integrated exhaust manifold and with a secondary air system with a butterfly valve.

The internal combustion engine according to the invention will be explained in greater detail below with reference to FIGS. 1 to 5. The internal combustion engine has a cylinder head 1 with an integrated exhaust manifold 2 that has multiple exhaust ducts 3. Furthermore, the internal combustion engine is equipped with a secondary air system 4 for supplying ambient air that is additionally supplied through an inlet 5 as secondary air into the exhaust manifold 2 into the exhaust gas flow downstream from the exhaust valves of the internal combustion engine during the cold-start phase. For fresh air supply, the secondary air system 4 has a plurality of supply ducts 7 that connect a distributor block 6 of the secondary air system 4 to an exhaust duct 3 and are arranged in the integrated exhaust manifold 2 and each provided with a valve assembly 8.

Figure 2:
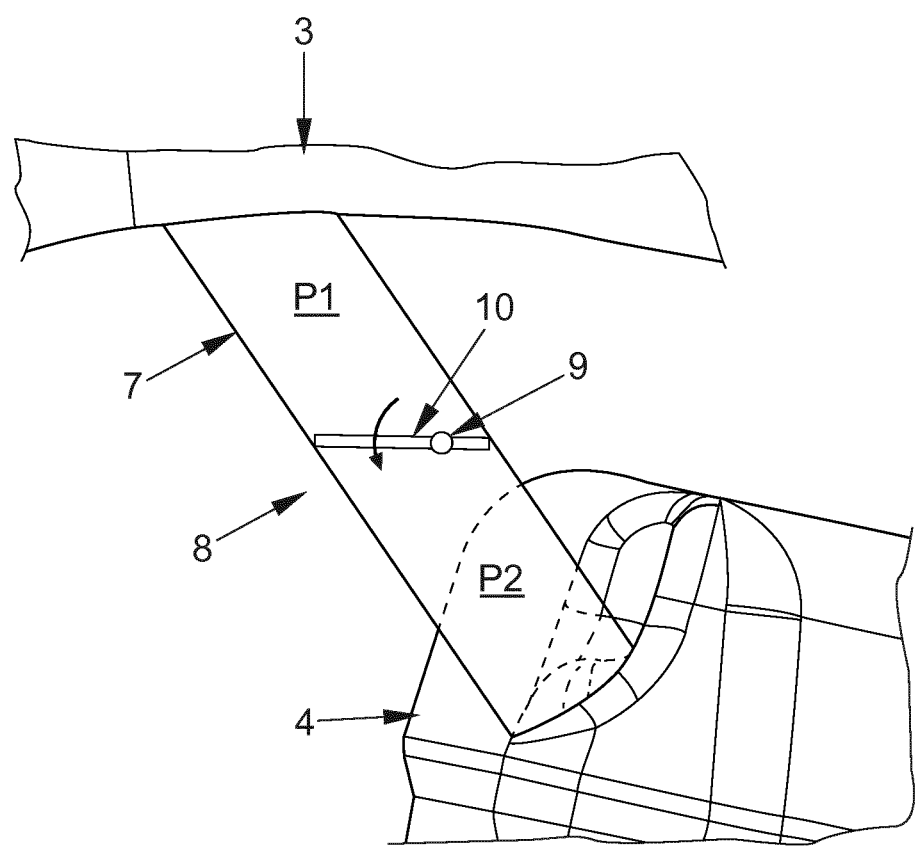
FIG. 2 shows a high-load operating state of the internal combustion engine with inactive secondary air system.

Each valve assembly 8 has a blocking means 10 in the form of a closure flap that is pivotable about a pivot axis 9, the pivot axis 9 being at a distance a from the center of mass of the blocking means 10. According to the installation position of the internal combustion engine as shown in FIG. 2 in a motor vehicle (not shown), and owing to this eccentric arrangement of the pivot axis, the blocking means assumes a defined closed position under the influence of gravity when there is no pressure difference between the exhaust manifold (2) and the secondary air system (4) or the gas pressure P1 on the side of the exhaust manifold 2 is greater than the gas pressure P2 on the side of the secondary air system 4.

Figure 3:
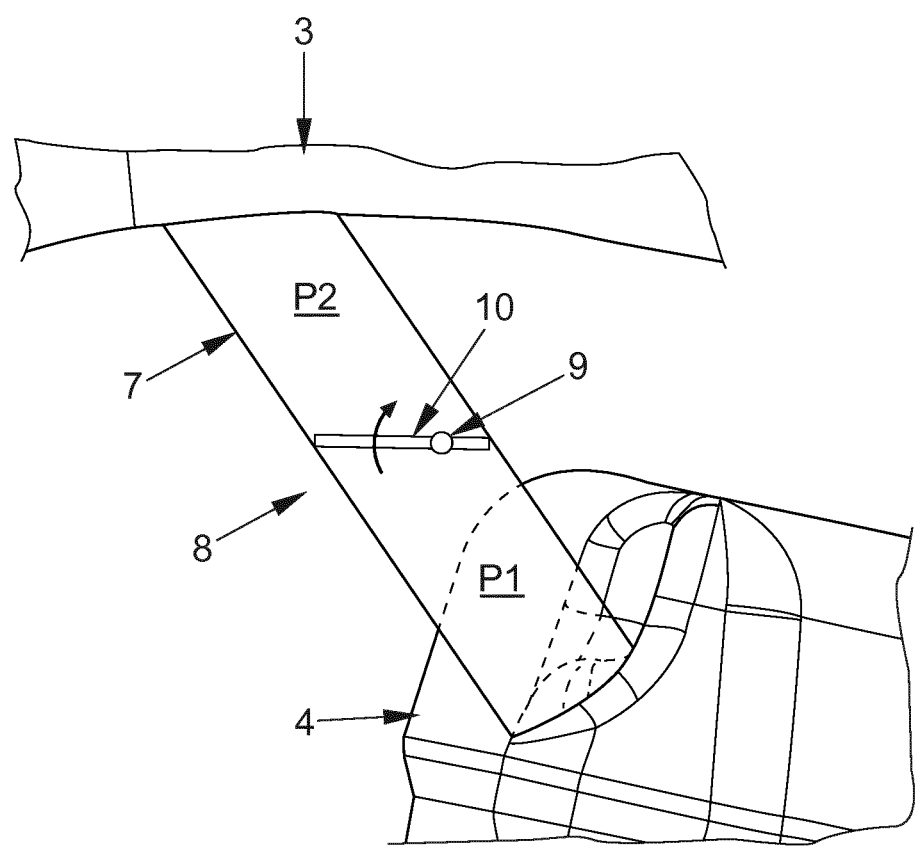
FIG. 3 shows a low-load operating state of the internal combustion engine with active secondary air system.

As can be seen in FIG. 3, the blocking means 10 pivots automatically into the open position oriented parallel to the main extension of the supply duct 7 under the influence of a relative overpressure of the gas pressure P1 on the side of the secondary air system 4 relative to the gas pressure P2 of the side of the exhaust manifold 2, so that the fresh air can flow almost unimpeded through the supply duct 7.

Figure 4:
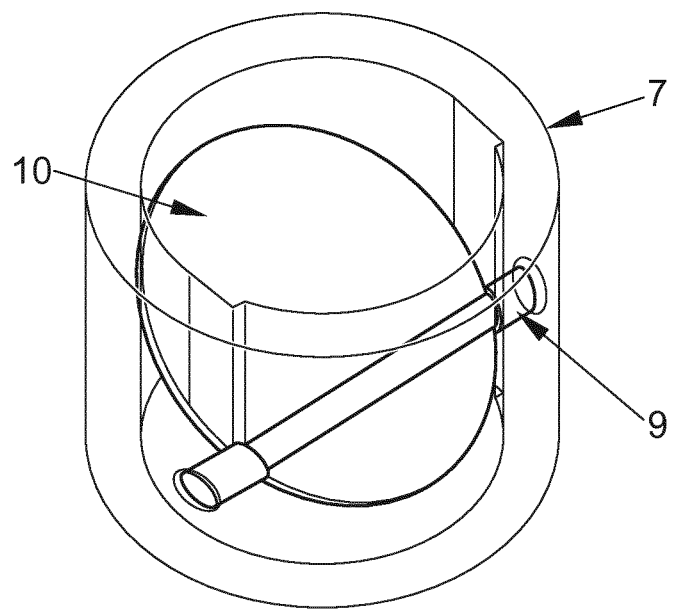
FIG. 4 shows an enlarged perspective view of the butterfly valve that is visible in FIG. 1.
Figure 5:
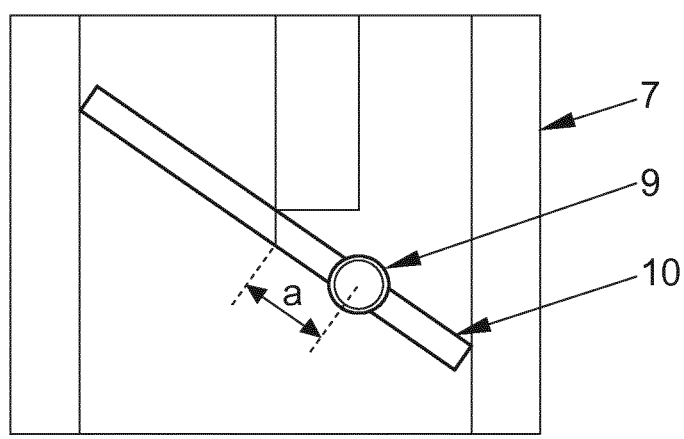
FIG. 5 shows a side view of the butterfly valve shown in FIG. 2.

In order to achieve a defined closed position of an orientation that is inclined relative to the cross-sectional plane of the supply duct 7 in the closed position, the blocking means 10 has an oval shape that is greater than the cross-sectional area in the supply duct 7 and therefore cannot be pivoted further, as can be seen in FIGS. 4 and 5.

LIST OF REFERENCE SYMBOLS

1 cylinder head
2 exhaust manifold
3 exhaust duct
4 secondary air system
5 inlet
6 distribution block
7 supply duct
8 valve assembly
9 pivot axis
10 blocking means
P1 gas pressure
P2 gas pressure
a distance

The invention claimed is:

1. An internal combustion engine, comprising:
a cylinder head having an integrated exhaust manifold which has multiple exhaust ducts and a secondary aft system;
at least one valve assembly for restricting a fluid flow of the exhaust gas from the exhaust manifold to the secondary air system;
wherein the exhaust manifold and the secondary aft system are designed as integral components of the cylinder head; and
wherein the secondary air system has a plurality of supply ducts, wherein each of said plurality of supply ducts has a valve assembly configured to connect the supply duct to a respective exhaust duct in the integrated exhaust manifold, wherein each valve assembly has a closing flap configured to:
be in a closed position when a gas pressure in the exhaust manifold is greater than or equal to a gas pressure in the secondary aft system, and
be in an open position when the gas pressure in the secondary system is greater than the gas pressure in the exhaust manifold,
wherein each closing flap, in a closed position, is inclined relative to a cross-sectional plane of the respective supply duct, and
wherein said each closing flap has an oval shape that deviates from a cross-sectional area on the cross-sectional plane of the respective supply duct.

2. The internal combustion engine as set forth in claim 1, wherein said each closing flap is arranged so as to be pivotable about a respective pivot axis that is at a distance from the center of mass of the closing flap.

3. The internal combustion engine as set forth in claim 1, wherein said each closing flap is configured to be in the closed position due to the influence of gravity when there is no pressure difference between the gas pressure in the exhaust manifold and the gas pressure in the secondary air system.

4. The internal combustion engine as set forth claim 1, wherein, in the absence of pressure difference, said each closing flap is in a parallel orientation relative to a main extension of the respective supply duct in a portion enclosing the closing flap.

5. The internal combustion engine as set forth in claim 1, wherein said each closing flap is adjustable.

6. The internal combustion engine as set forth in claim 1, wherein each valve assembly is arranged within the respective supply duct vertically below the exhaust manifold and vertically above the secondary air system.

* * * * *